UNITED STATES PATENT OFFICE.

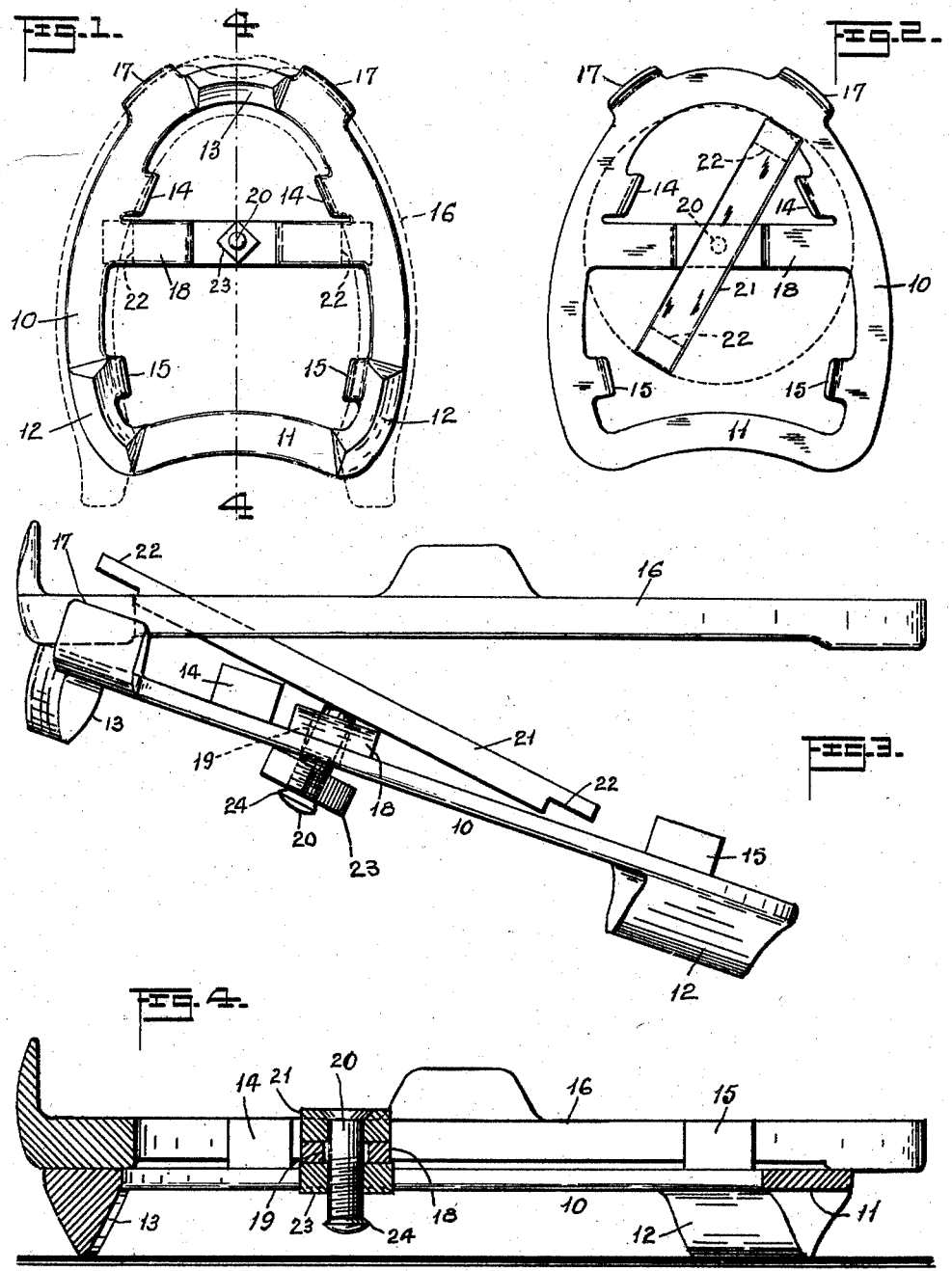

JAMES STANLEY, OF NEWARK, NEW JERSEY, ASSIGNOR OF ONE-HALF TO FRANK BRABSON, OF NEWARK, NEW JERSEY.

OVERSHOE FOR HORSESHOES.

965,663.  Specification of Letters Patent.  Patented July 26, 1910.

Application filed July 2, 1909. Serial No. 505,562.

*To all whom it may concern:*

Be it known that I, JAMES STANLEY, a citizen of the United States, residing at Newark, in the county of Essex and State of New Jersey, have invented certain Improvements in Overshoes for Horseshoes, of which the following is a specification.

The objects of this invention are to provide an overshoe which can be applied to a horse's foot when the pavement is slippery, as from ice, or wet asphalt or wood pavement; to secure such an overshoe which can be readily attached to and detached from the horseshoe; to secure a firm and solid attachment of the overshoe to the shoe, so as to give the horse good footing; to secure a construction devoid of projections at the side of the horse's foot, such as might strike the other leg in traveling; to secure a simple and strong construction which shall be durable and not liable to get out of order, and to obtain other advantages and results as may be brought out in the following description.

Referring to the accompanying drawings, in which like numerals of reference indicate corresponding parts in each of the several figures, Figure 1 is a view of the tread surface of the overshoe as applied to a horseshoe shown in dotted lines; Fig. 2 is a top view of the overshoe, looking at the surface which seats against the horseshoe; Fig. 3 shows in side elevation a horseshoe and the overshoe in the act of being applied thereto; Fig. 4 is a central vertical section of the overshoe applied to a horseshoe, taken from front to rear on line 4—4 of Fig. 1.

In said drawings, 10 indicates the body portion of my improved overshoe, said body portion being of metal and having the shape of a horseshoe so as to lie flatwise against the bottom thereof, as shown in the drawings. The rear ends or heels of the body portion 10 are preferably connected by an end piece 11, and upon the tread surface of the overshoe are sharp calks 12, 12 adjacent to said heels and a toe calk 13 at the forward part of the overshoe. From the inner edges of the sides of the U-shaped body portion 10, front and rear lugs 14, 15 project from the plane of said body portion at the side opposite the tread surface. These lugs 14 and 15 are adapted to lie against the inner edges of a horseshoe 16, being so disposed near the front and rear ends of the curved sides of the shoe as to prevent material movement of the overshoe with respect to the horseshoe in a plane parallel thereto. I have also shown adjacent to the toe of the overshoe and on opposite sides thereof, lugs 17 projecting from the outer edge of the body portion 10 of the overshoe and adapted to overlie the outer edge of the horseshoe 16. These outer lugs 17, 17 may be dispensed with, however, and I do not wish to be understood as restricting myself to the use of them.

Between its front and rear ends, the body portion 10 of my improved overshoe has a cross bar 18, which cross bar is preferably between the lugs 14 and 15, as shown. The middle portion of this cross bar 18 is preferably depressed or bent away from the tread surface of the overshoe, and is apertured, as at 19, to receive the stem 20 of a locking bar 21, which normally lies parallel to the cross bar 18 with its ends projecting under the edges of the horseshoe 16, between said horseshoe and the horse's hoof. These ends 22 are shown in the drawings as reduced in thickness, and obviously they can be swung into and out of place by rotating the locking bar 21 upon its stem 20. Said stem is threaded to receive a nut 23 lying at the opposite side of the cross bar 18 from the locking bar 21, and the extremity of said stem 20 is provided with means for preventing the inadvertent escape of said nut 23. This means is illustrated in the drawing by showing the end of the stem upset, as at 24, but any other equivalent retaining means could be employed without departing from the scope of the invention.

Fig. 3 shows the proper way of applying the overshoe to a horseshoe. The locking bar 21 having been turned to extend longitudinally of the shoe, and the nut 23 loosened, the toe of the overshoe is laid against the toe of the horseshoe with the end of the locking bar 21 projecting beneath the horseshoe or inside the same, if it extends that far. The outer lugs 17, 17, if any, of course lie outside of the horseshoe, and the inner lugs 14, 15 fall inside the same as the overshoe is swung upward on its toe as a pivot and pressed firmly against the tread surface of the horseshoe. The locking bar 21 is then rotated or swung a quarter turn, so as to bring it directly above the cross bar 18, and then the nut 23 is tightened firmly into place. The relation of the overshoe to the horseshoe is then as shown in Figs. 1 and 4, and obviously the sharp calks 12 and 13 engage the ground to entirely support the horse, the stem 20 being somewhat shorter than said calks, as shown in Fig. 4.

Having thus described the invention, what I claim is:

1. The herein described overshoe for horses, comprising a horseshoe-shaped body portion adapted to fit upon and underlie the tread surface of a horseshoe, a cross-bar integrally connecting the arms of said body portion, means at the outer edges of the opposite sides of said body portion at its front end adapted to extend upward outside the horseshoe and hold the overshoe thereto, and a locking bar pivoted on said cross bar and adapted to overlap at its opposite ends the arms of the horseshoe on the opposite side thereof from the body portion of the overshoe.

2. The herein described overshoe for horses, comprising a horseshoe-shaped body portion adapted to fit upon and underlie the tread surface of a horseshoe, a cross-bar integrally connecting the arms of said body portion, means at the outer edges of the opposite sides of said body portion at its front end adapted to extend upward outside the horseshoe and hold the overshoe thereto, a locking bar pivoted on said cross bar and adapted to overlap at its opposite ends the arms of the horseshoe on the opposite side thereof from the body portion of the overshoe, and means for clamping said locking bar and body portion together to grip the horseshoe between them.

3. The herein described overshoe for horseshoes, comprising a body portion adapted to fit on the tread surface of a horseshoe, front and rear pairs of lugs projecting from the inner edge of said body portion away from the plane thereof and adapted to lie at the inner edges of the horseshoe, a cross bar on said body portion between said front and rear lugs, a locking bar on said cross bar adapted to engage the horseshoe adjacent to its inner edge, and means for clamping said locking bar to said body portion.

4. The herein described overshoe for horseshoes, comprising a body portion adapted to fit on the tread surface of a horseshoe, front and rear pairs of lugs projecting from the inner edge of said body portion away from the plane thereof and adapted to lie at the inner edges of the horseshoe, a cross bar on said body portion between said front and rear lugs, a locking bar adapted to lie parallel to said cross bar with its ends overlapping the horseshoe at its opposite side from said cross bar, a bolt pivoting said locking bar to said cross bar, and a clamping nut on said bolt.

5. The herein described overshoe for horseshoes, comprising a body portion adapted to fit on the tread surface of a horseshoe, outer lugs projecting from the outer edges of the toe of said body portion, inner lugs projecting from the inner edge of said body portion at a point rearward of said outer lugs, all of said lugs extending away from the plane of the body and being adapted to lie at the edges of the horseshoe, and means for clamping said overshoe to the horseshoe.

JAMES STANLEY.

In the presence of—
RUSSELL M. EVERETT,
FRANCES E. BLODGETT.